(12) United States Patent
Tsujikawa

(10) Patent No.: US 9,959,873 B2
(45) Date of Patent: May 1, 2018

(54) METHOD FOR GENERATING UNSPECIFIED SPEAKER VOICE DICTIONARY THAT IS USED IN GENERATING PERSONAL VOICE DICTIONARY FOR IDENTIFYING SPEAKER TO BE IDENTIFIED

(71) Applicant: Panasonic Intellectual Property Corporation of America, Torrance, CA (US)

(72) Inventor: Misaki Tsujikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days. days.

(21) Appl. No.: 15/418,230

(22) Filed: Jan. 27, 2017

(65) Prior Publication Data

US 2017/0263257 A1  Sep. 14, 2017

(30) Foreign Application Priority Data

Mar. 11, 2016  (JP) .................................. 2016-048243

(51) Int. Cl.
*G10L 15/06* (2013.01)
*G10L 17/04* (2013.01)
*G10L 17/02* (2013.01)
*G10L 17/20* (2013.01)

(52) U.S. Cl.
CPC .............. *G10L 17/04* (2013.01); *G10L 17/02* (2013.01); *G10L 17/20* (2013.01)

(58) Field of Classification Search
CPC .................................. G10L 15/06; G06F 17/30
See application file for complete search history.

(56) References Cited

U.S. PATENT DOCUMENTS

| | | | | |
|---|---|---|---|---|
| 2002/0059068 A1* | 5/2002 | Rose | ........................ | G10L 15/08 704/246 |
| 2003/0033143 A1* | 2/2003 | Aronowitz | .............. | G10L 15/20 704/233 |
| 2005/0143997 A1* | 6/2005 | Huang | .................... | G10L 17/04 704/247 |
| 2014/0278420 A1* | 9/2014 | Meloney | ............... | G10L 15/063 704/249 |

FOREIGN PATENT DOCUMENTS

JP  5-143094  6/1993

* cited by examiner

*Primary Examiner* — Shreyans Patel
(74) *Attorney, Agent, or Firm* — Greenblum & Bernstein, P.L.C.

(57) ABSTRACT

A method for generating voice dictionary is disclosed which makes it possible to improve the accuracy of speaker identification. A method according to an aspect of the present disclosure includes: acquiring voices of a plurality of unspecified speakers; acquiring noise in a predetermined place; superimposing the noise onto the voices of the plurality of unspecified speakers; and generating, on the basis of the features of the voices of the plurality of unspecified speakers, unspecified speaker voice dictionary that is used for generating personal voice dictionary for identifying a target speaker.

8 Claims, 14 Drawing Sheets

FIG. 6

| UBM | IN-CAR | | OUTDOOR | SEMI-OUTDOOR | INDOOR | DURING-THE-PERFORMANCE |
|---|---|---|---|---|---|---|
| LEARNING AND SPEAKER IDENTIFICATION | 1000 cc | 2000 cc | ROAD | INSIDE STATION | FIRST FACTORY | PIANO |
| | | | CROWD | PLATFORM | SECOND FACTORY | FLUTE |

FIG. 7

| UBM NOISE | CLEAN | | 18 | | 12 | | 6 | | 0 | |
|---|---|---|---|---|---|---|---|---|---|---|
| | CONTAINED | NOT CONTAINED | CONTAINED | NOT CONTAINED | CONTAINED | NOT CONTAINED | CONTAINED | NOT CONTAINED | CONTAINED | NOT CONTAINED |
| CLEAN | 100 | 98 | 100 | 97 | 100 | 95 | 97 | 85 | 85 | 69 |
| 18 | 100 | 95 | 100 | 96 | 99 | 94 | 96 | 85 | 83 | 68 |
| 12 | 97 | 86 | 97 | 89 | 97 | 89 | 94 | 83 | 82 | 67 |
| 6 | 90 | 73 | 91 | 77 | 91 | 79 | 90 | 75 | 84 | 63 |
| 0 | 67 | 48 | 68 | 50 | 70 | 52 | 73 | 53 | 72 | 54 |

LEARNING VOICE DATA SN RATIO [dB]

IDENTIFICATION VOICE DATA SN RATIO [dB]

METHOD FOR GENERATING UNSPECIFIED SPEAKER VOICE DICTIONARY THAT IS USED IN GENERATING PERSONAL VOICE DICTIONARY FOR IDENTIFYING SPEAKER TO BE IDENTIFIED

BACKGROUND

1. Technical Field

The present disclosure relates to a method for, an apparatus for, and a non-transitory computer-readable recording medium storing a program for generating unspecified speaker voice dictionary that is used in generating personal voice dictionary for identifying a speaker to be identified.

2. Description of the Related Art

Conventionally, it has been difficult for a speaker identification apparatus that identifies a speaker to correctly identify a speaker in a case where noise is contained in an inputted voice of the speaker. To address this problem, for example, Japanese Unexamined Patent Application Publication No. 5-143094 discloses a neural network-based speaker recognition system intended to achieve a higher recognition rate by superimposing noise onto learning patterns and increasing the number of simulated patterns.

However, since the conventional speaker recognition system of Japanese Unexamined Patent Application Publication No. 5-143094 generates simulated learning patterns by superimposing noise onto voices of a speaker to be identified and uses the simulated learning patterns thus generated for learning of a neural network, the system needs to acquire voices of the speaker to be identified in advance, and in a case where the speaker to be identified speaks little, insufficiency in amount of data results and makes it impossible to create an optimum neural network by learning, thus undesirably reducing the accuracy with which the speaker is identified.

SUMMARY

One non-limiting and exemplary embodiment provides a voice dictionary generation method, a voice dictionary generation apparatus, and a non-transitory computer-readable recording medium storing a voice dictionary generation program that make it possible to improve the accuracy of speaker identification.

In one general aspect, the techniques disclosed here feature a method including: acquiring voices of a plurality of unspecified speakers; acquiring noise in a predetermined place; superimposing the noise onto the voices of the plurality of unspecified speakers; and generating an unspecified speaker voice dictionary from features of the voices of the plurality of unspecified speakers onto which the noise has been superimposed, wherein the unspecified speaker voice dictionary is used in generating personal voice dictionary for identifying a speaker to be identified.

The present disclosure makes it possible to improve the accuracy of speaker identification.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a table showing the types of environment in which noise was acquired for use in a simulation experiment and the types of noise acquired;

FIG. 7 is a table showing, in the simulation experiment, identification rates respectively corresponding to the SN ratios of learning voice data and the SN ratios of identification voice data in the case of use of a noise-containing UBM and identification rates respectively corresponding to the SN ratios of learning voice data and the SN ratios of identification voice data in the case of use of a noise-free UBM;

DETAILED DESCRIPTION

Figure 1:
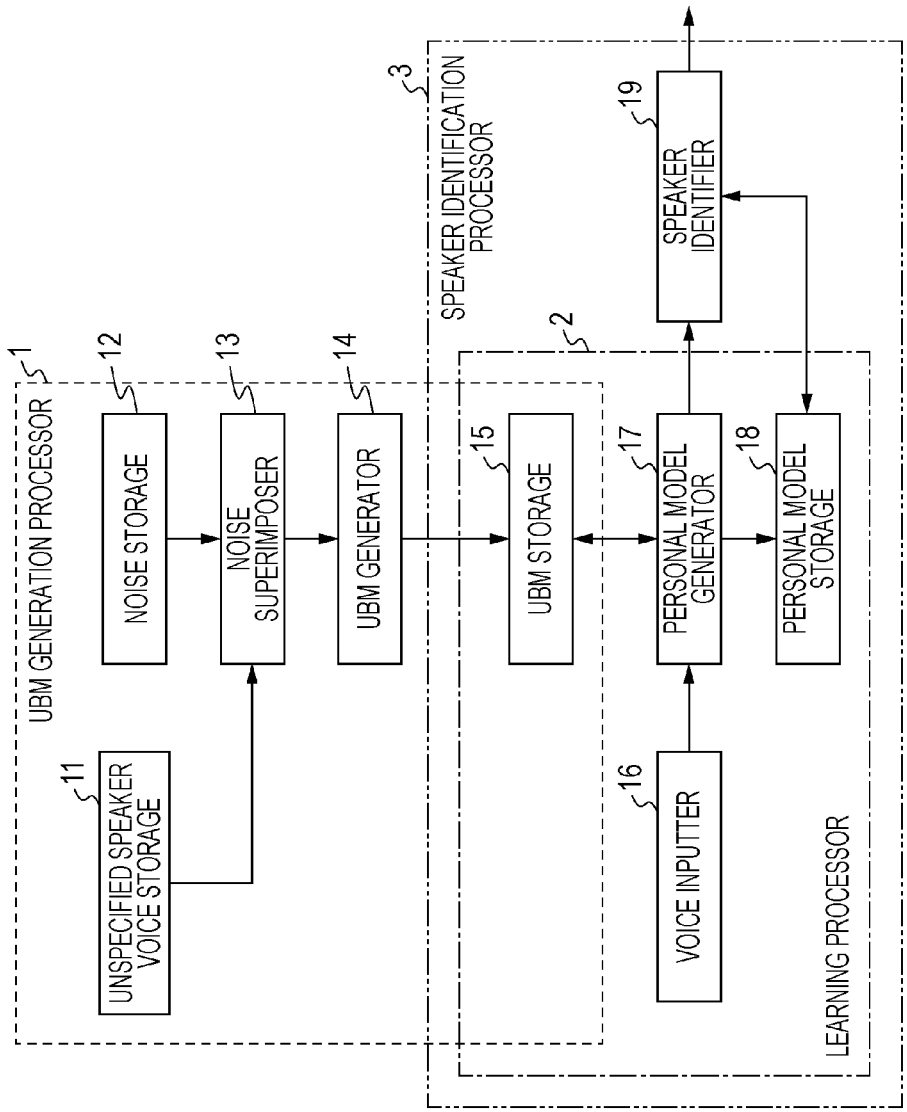
FIG. 1 is a diagram showing a configuration of a speaker identification apparatus according to Embodiment 1.

Underlying Knowledge Forming Basis of the Present Disclosure

As mentioned above, it has conventionally been difficult for a speaker identification apparatus that identifies a speaker to correctly identify a speaker in a case where noise is contained in an inputted voice of the speaker. To address this problem, for example, Japanese Unexamined Patent Application Publication No. 5-143094 discloses a neural network-based speaker recognition system intended to achieve a higher recognition rate by superimposing noise onto learning patterns and increasing the number of simulated patterns.

However, since the conventional speaker recognition system of Japanese Unexamined Patent Application Publication No. 5-143094 generates simulated learning patterns by superimposing noise onto voices of a speaker to be identified and uses the simulated learning patterns thus generated for learning of a neural network, the system needs to acquire voices of the speaker to be identified in advance, and in a case where the speaker to be identified speaks little, insufficiency in amount of data results and makes it impossible to create an optimum neural network by learning, thus undesirably reducing the accuracy with which the speaker is identified.

In one general aspect, the techniques disclosed here feature a method including: acquiring voices of a plurality of unspecified speakers; acquiring noise in a predetermined place; superimposing the noise onto the voices of the plurality of unspecified speakers; and generating an unspecified speaker voice dictionary from features of the voices of the plurality of unspecified speakers onto which the noise has been superimposed, wherein the unspecified speaker voice dictionary is used in generating personal voice dictionary for identifying a speaker to be identified.

According to this configuration, the voices of the plurality of unspecified speakers are acquired, and the noise is acquired. The noise is superimposed onto the voices of the plurality of unspecified speakers. The unspecified speaker voice dictionary, which is used for generating the personal voice dictionary for identifying the speaker to be identified, is generated on the basis of the features of the voices of the plurality of unspecified speakers onto which the noise has been superimposed.

Therefore, since the unspecified speaker voice dictionary, which is used for generating the personal voice dictionary for identifying the speaker to be identified, is generated on the basis of the features of the voices of the plurality of unspecified speakers onto which the noise has been superimposed, the personal voice dictionary thus generated can be accurate even if noise is contained in a voice of the speaker to be identified. This makes it possible to improve the accuracy of speaker identification.

Further, the method may further include: adjusting a sound pressure of the noise on the basis of sound pressures of the voices of the plurality of unspecified speakers; and superimposing, onto the voices of the plurality of unspecified speakers, the noise whose sound pressure has been adjusted.

According to this configuration, the sound pressure of the noise is adjusted on the basis of the sound pressures of the voices of the plurality of unspecified speakers, and the noise whose sound pressure has been adjusted is superimposed onto the voices of the plurality of unspecified speakers. Therefore, since the sound pressure of the noise that is superimposed onto the voices of the plurality of unspecified speakers is adjusted, the noise whose sound pressure is most suitable for generating the unspecified speaker voice dictionary can be superimposed. This makes it possible to improve the accuracy of speaker identification.

Further, the method may further include adjusting the sound pressure of the noise so that a sound pressure difference between an average sound pressure of the voices of the plurality of unspecified speakers and the sound pressure of the noise takes on a predetermined value.

According to this configuration, since the sound pressure of the noise is adjusted so that the sound pressure difference between the average sound pressure of the voices of the plurality of unspecified speakers and the sound pressure of the noise takes on the predetermined value, the sound pressure of the noise to be superimposed can be easily adjusted to be most suitable.

Further, the method may further include: acquiring voices of the speaker to be identified in a process of learning the personal voice dictionary; generating the personal voice dictionary through the use of the voices thus acquired of the speaker to be identified and the unspecified speaker voice dictionary thus generated; acquiring the voices of the speaker to be identified in a process of identifying the speaker to be identified; identifying the speaker to be identified through the use of the personal voice dictionary thus generated and the voices thus acquired of the speaker to be identified; and making the predetermined value larger in the case of a failure to identify the speaker to be identified.

According to this configuration, the voices of the speaker to be identified are acquired in the process of learning the personal voice dictionary. The personal voice dictionary is generated through the use of the voices thus acquired of the speaker to be identified and the unspecified speaker voice dictionary thus generated. The voices of the speaker to be identified are acquired in the process of identifying the speaker to be identified. The speaker to be identified is identified through the use of the personal voice dictionary thus generated and the voices thus acquired of the speaker to be identified. The predetermined value is made larger in the case of a failure to identify the speaker to be identified.

Therefore, since, in the case of a failure to identify the speaker to be identified, the predetermined value is made larger and the sound pressure of the noise that is superimposed onto the plurality of unspecified speakers is adjusted, the sound pressure of the noise can be changed so that a better identification result can be obtained. This makes it possible to further improve the accuracy of speaker identification.

Further, the method may further include: acquiring the voices of the plurality of unspecified speakers from a first memory storing the voices of the plurality of unspecified speakers in advance; and acquiring the noise from a second memory storing the noise in advance.

According to this configuration, since the voices of the plurality of unspecified speakers are acquired from the unspecified speaker voice storage storing the voices of the plurality of unspecified speakers in advance and the noise is acquired from the noise storage storing the noise in advance, the unspecified speaker voice dictionary can be easily generated by storing the voices of the plurality of unspecified speakers and the noise in advance.

Further, the method may further include: collecting noise of an environment surrounding a place where the speaker to be identified is identified; and storing the noise thus collected in the second memory.

According to this configuration, since the noise of the environment surrounding the place where the speaker to be identified is identified is collected and the noise thus collected is stored in the noise storage, the noise of the environment surrounding the place where the speaker to be identified is actually identified can be superimposed onto the voices of the plurality of unspecified speakers in generating the unspecified speaker voice dictionary. This makes it possible to further improve the accuracy of speaker identification.

Further, the method may further include: acquiring a plurality of noises having different frequency characteristics; and superimposing the plurality of noises onto the voices of the plurality of unspecified speakers.

According to this configuration, the plurality of noises having different frequency characteristics are acquired, the plurality of noises are superimposed onto the voices of the plurality of unspecified speakers. Therefore, since the plurality of noises having different frequency characteristics are superimposed onto the voices of the plurality of unspecified speakers, the unspecified speaker voice dictionary can be generated with higher versatility.

In another general aspect, the techniques disclosed here feature an apparatus including: a processor; and a memory storing therein a computer program, which when executed by the processor, causes the processor to perform operations including: acquiring voices of a plurality of unspecified speakers; acquiring noise in a predetermined place; superimposing the noise onto the voices of the plurality of unspecified speakers; and generating the unspecified speaker voice dictionary from features of the voices of the plurality of unspecified speakers onto which the noise has been superimposed, wherein the unspecified speaker voice dictionary is used in generating personal voice dictionary for identifying a speaker to be identified.

According to this configuration, the voices of the plurality of unspecified speakers are acquired, and the noise is acquired. The noise is superimposed onto the voices of the plurality of unspecified speakers. The unspecified speaker voice dictionary, which is used for generating the personal voice dictionary for identifying the speaker to be identified, is generated on the basis of the features of the voices of the plurality of unspecified speakers onto which the noise has been superimposed.

Therefore, since the unspecified speaker voice dictionary, which is used for generating the personal voice dictionary for identifying the speaker to be identified, is generated on the basis of the features of the voices of the plurality of unspecified speakers onto which the noise has been superimposed, the personal voice dictionary thus generated can be accurate even if noise is contained in a voice of the speaker to be identified. This makes it possible to improve the accuracy of speaker identification.

In another general aspect, the techniques disclosed here feature a non-transitory recording medium storing thereon a computer program, which when executed by a processor, causes the processor to perform operations including: acquiring voices of a plurality of unspecified speakers; acquiring noise in a predetermined place; superimposing the noise onto the voices of the plurality of unspecified speakers; and generating the unspecified speaker voice dictionary from features of the voices of the plurality of unspecified speakers onto which the noise has been superimposed, wherein the unspecified speaker voice dictionary is used in generating personal voice dictionary for identifying a speaker to be identified.

According to this configuration, the voices of the plurality of unspecified speakers are acquired, and the noise is acquired. The noise is superimposed onto the voices of the plurality of unspecified speakers. The unspecified speaker voice dictionary, which is used for generating the personal voice dictionary for identifying the speaker to be identified, is generated on the basis of the features of the voices of the plurality of unspecified speakers onto which the noise has been superimposed.

Therefore, since the unspecified speaker voice dictionary, which is used for generating the personal voice dictionary for identifying the speaker to be identified, is generated on the basis of the features of the voices of the plurality of unspecified speakers onto which the noise has been superimposed, the personal voice dictionary thus generated can be accurate even if noise is contained in a voice of the speaker to be identified. This makes it possible to improve the accuracy of speaker identification.

Embodiments of the present disclosure are described below with reference to the accompanying drawings. It should be noted that the embodiments below are mere concrete examples of the present disclosure and, as such, are not intended to limit the technical scope of the present disclosure.

Embodiment 1

FIG. 1 is a diagram showing a configuration of a speaker identification apparatus according to Embodiment 1. The speaker identification apparatus is built, for example, in a television, a smartphone, a car navigation system, or the like.

As shown in FIG. 1, the speaker identification apparatus includes an unspecified speaker voice storage 11, a noise storage 12, a noise superimposer 13, a UBM (universal background model) generator 14, a UBM storage 15, a voice inputter 16, a personal model generator 17, a personal model storage 18, and a speaker identifier 19.

Further, a UBM generation processor 1 is constituted by the unspecified speaker voice storage 11, the noise storage 12, the noise superimposer 13, the UBM generator 14, and the UBM storage 15. A learning processor 2 is constituted by the UBM storage 15, the voice inputter 16, the personal model generator 17, and the personal model storage 18. A speaker identification processor 3 is constituted by the UBM storage 15, the voice inputter 16, the personal model generator 17, the personal model storage 18, and the speaker identifier 19.

The speaker identification apparatus according to Embodiment 1 performs three process, namely a UBM generation process, a learning process, and a speaker identification process.

The UBM generation processor 1 generates, on the basis of features of voices of a plurality of unspecified speakers, a UBM that is used for generating a personal model for identifying a speaker to be identified. The UBM is an example of an unspecified speaker voice dictionary, and the personal model is an example of a personal voice dictionary.

The learning processor 2 generates, through the use of voices of a speaker to be identified and a UBM generated by the UBM generation processor 1, a personal model for identifying the speaker to be identified, and stores the personal model thus generated.

The speaker identification processor 3 generates, through the use of voices of a speaker to be identified and a UBM generated by the UBM generation processor 1, a personal model for identifying the speaker to be identified, and identifies the speaker to be identified by determining the degree of similarity between the personal model thus generated and a personal model stored.

The speaker identification apparatus according to Embodiment 1 identifies a speaker by a speaker identification method called "i-vector". Speaker identification based on i-vector includes utilizing factor analysis to extract unique features contained in a speaker and determining the speaker by comparing the features thus extracted. Since i-vector uses factor analysis in feature extraction, it makes it possible to express a feature with a dimensional reduction, thus making it possible to efficiently express the characteristics of a speaker even with a small amount of speech data.

In the unspecified speaker voice storage 11, voices of a plurality of unspecified speakers are stored in advance. In the noise storage 12, noise in a predetermined place is stored in advance. It should be noted that it is preferable that a plurality of noises having different frequency characteristics be stored in the noise storage 12.

The noise superimposer 13 acquires voices of a plurality of unspecified speakers, acquires noise in a predetermined place, and superimposes the noise onto the voices of the plurality of unspecified speakers. It should be noted that in a case where a plurality of noises are stored in the noise storage 12, the noise superimposer 13 may calculate an average noise by averaging the plurality of noises and superimpose the average noise thus calculated onto each of the voices of the plurality of unspecified speakers. Further, the noise superimposer 13 may superimpose each of the plurality of noises onto each of the voices of the plurality of unspecified speakers.

The UBM generator 14 generates a UBM from features of the voices of the plurality of unspecified speakers onto which the noise has been superimposed. It should be noted that the method for generating a UBM from the voices of the plurality of unspecified speakers is the same as the method for generating a UBM in the speaker identification method called "i-vector". The UBM storage 15 stores the UBM generated by the UBM generator 14.

The voice inputter 16 is constituted, for example, by a microphone. The voice inputter 16 collects voices of a speaker in the learning process or the speaker identification process and converts the voices thus collected into voice signals.

The personal model generator 17, in the learning process, generates, through the use of the voices of the speaker as inputted by the voice inputter 16 and the UBM stored in the UBM storage 15, a personal model for identifying the speaker, and stores the personal model thus generated in the personal model storage 18. At this point in time, the personal model generator 17 stores the personal model thus generated in the personal model storage 18 in association with speaker identification information for identifying the speaker who inputted the voices. The speaker identification information is for example the name of the speaker, and is inputted by the speaker using an inputter (not illustrated). It should be noted that the method for generating a personal model from the voices of the speaker and the UBM is the same as the method for generating a personal model in the speaker identification method called "i-vector".

Further, the personal model generator 17, in the speaker identification process, generates, through the use of the voices of the speaker as inputted by the voice inputter 16 and the UBM stored in the UBM storage 15, a personal model for identifying the speaker, and outputs the personal model thus generated to the speaker identifier 19.

The personal model storage 18 stores the speaker identification information for identifying the speaker and the personal model generated by the personal model generator 17. The personal model storage 18 stores personal models for each separate speaker registered in advance.

The speaker identifier 19, in the speaker identification process, identifies, on the basis of the personal model outputted by the personal model generator 17 and the personal model stored in the personal model storage 18, the speaker whose voices were inputted by the voice inputter 16. That is, the speaker identifier 19, in the speaker identification process, calculates the degree of similarity between the personal model outputted by the personal model generator 17 and the personal model stored in the personal model storage 18. Moreover, the speaker identifier 19 determines whether the degree of similarity between personal models from which the highest degree of similarity was calculated is greater than a threshold value, and in a case where the speaker identifier 19 determines that the highest degree of similarity is greater than the threshold value, the speaker identifier 19 outputs, as an identification result, speaker identification information associated with the personal models with the highest degree of similarity. It should be noted that in a case where the speaker identifier 19 determines that the highest degree of similarity is equal to or less than the threshold value, the speaker identifier 19 outputs, as an identification result, information indicating that the speaker whose voices were inputted is unregistered.

It should be noted that, in Embodiment 1, a terminal apparatus such as a television or a smartphone may include the voice inputter 16 and the speaker identification apparatus may include the components other than the voice inputter 16. In this case, the speaker identification apparatus is constituted, for example, by a server and communicably connected to the terminal apparatus via a network. The server may include some or all of the functions of the speaker identification apparatus.

Further, the speaker may be a user who operates a household appliance installed in a home.

Further, although, in Embodiment 1, the learning processor 2 and the speaker identification processor 3 share the voice inputter 16 and the personal model generator 17, the learning processor 2 and the speaker identification processor 3 may alternatively include their respective voice inputters 16 and personal model generators 17.

Figure 2:
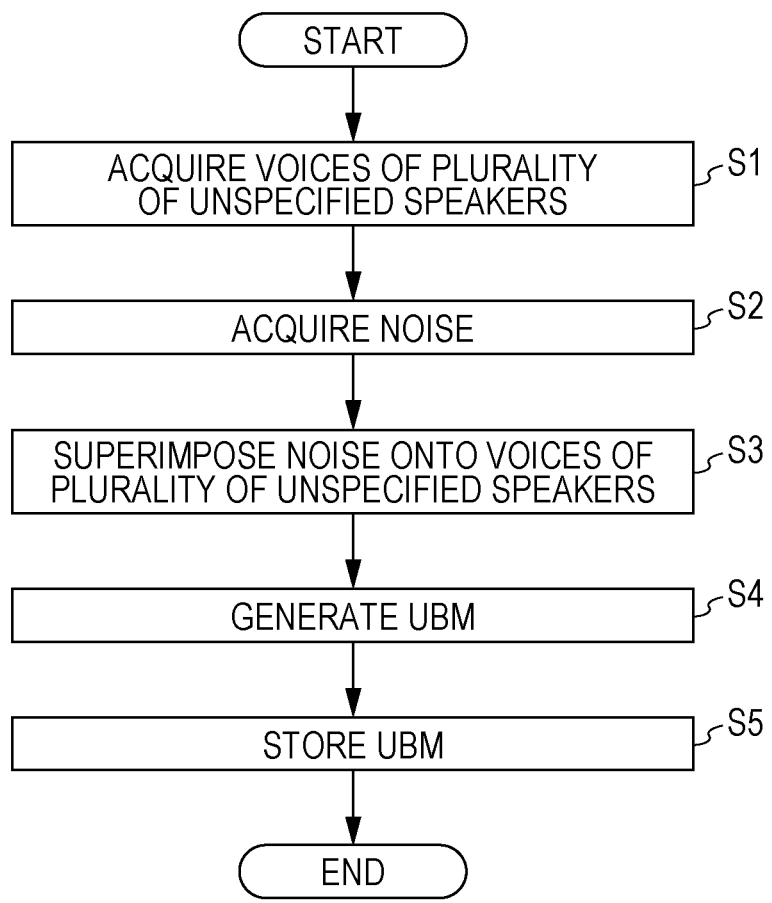
FIG. 2 is a flow chart for explaining the actions in a UBM generation process that is performed by the speaker identification apparatus according to Embodiment 1.

The following describes the actions in a UBM generation process (voice dictionary generation process) that is performed by the speaker identification apparatus according to Embodiment 1. FIG. 2 is a flow chart for explaining the actions in the UBM generation process that is performed by the speaker identification apparatus according to Embodiment 1.

First, in step S1, the noise superimposer 13 acquires voices of a plurality of unspecified speakers from the unspecified speaker voice storage 11.

Next, in step S2, the noise superimposer 13 acquires noise from the noise storage 12.

Next, in step S3, the noise superimposer 13 superimposes the noise onto each of the voices of the plurality of unspecified speakers.

Next, in step S4, the UBM generator 14 generates a UBM from features of the voices of the plurality of unspecified speakers onto which the noise has been superimposed. The UBM generator 14 calculates the features of the voices of the plurality of unspecified speakers onto which the noise has been superimposed. Note here that the features are for example MFCCs (Mel—frequency cepstrum coefficients). The UBM generator 14 generates the UBM from the features thus calculated. It should be noted that the method for generating a UBM is the same as the method for generating a UBM in i-vector.

Next, in step S5, the UBM generator 14 stores the UBM thus generated in the UBM storage 15.

Thus, since the UBM, which is used for generating the personal model for identifying the speaker to be identified, is generated from the features of the voices of the plurality of unspecified speakers onto which the noise has been superimposed, the personal model thus generated can be accurate even if noise is contained in a voice of the speaker to be identified. This makes it possible to improve the accuracy of speaker identification.

Further, the addition of the noise to the voices of the unspecified speakers that are used in the UBM eliminates the conventional need to add noise to a voice of the speaker to be identified. This simplifies processes at the time of learning and speaker identification and makes it possible to improve the accuracy of speaker identification in a noise environment.

Further, since the personal model is generated through the use of the UBM generated by intentionally adding various types of noise to the voices of the unspecified speakers, the accuracy of speaker identification in a noise environment can be more improved than when a UBM generated from voices to which no noise is added is used.

The following describes a first example of generation of a personal model on the basis of a UBM generated from voices of a plurality of unspecified speakers as acquired in noiseless ideal environments and voices of a speaker to be identified as acquired in noiseless ideal environments, a second example of generation of a personal model on the basis of a UBM generated from voices of a plurality of unspecified speakers as acquired in noiseless ideal environments and voices of a speaker to be identified as acquired in noisy environments, and a third example of generation of a personal model on the basis of a UBM generated from voices of a plurality of unspecified speakers as acquired in noisy environments and voices of a speaker to be identified as acquired in noisy environments.

Figure 3:
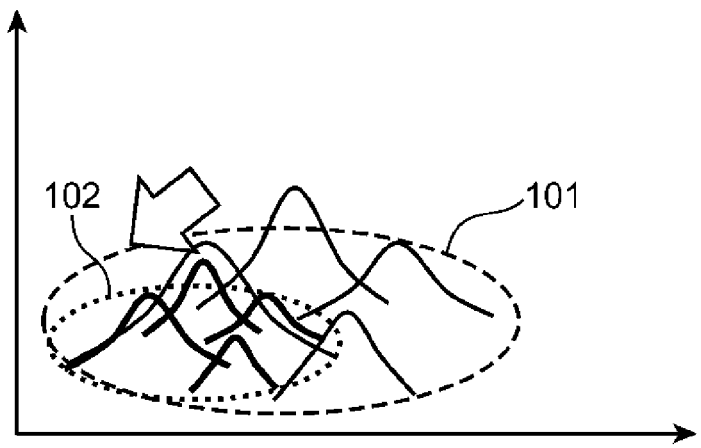
FIG. 3 is a diagram for explaining a first example of generation of a personal model on the basis of a UBM generated from voices of a plurality of unspecified speakers as acquired in noiseless ideal environments and voices of a speaker to be identified as acquired in noiseless ideal environments.
Figure 4:
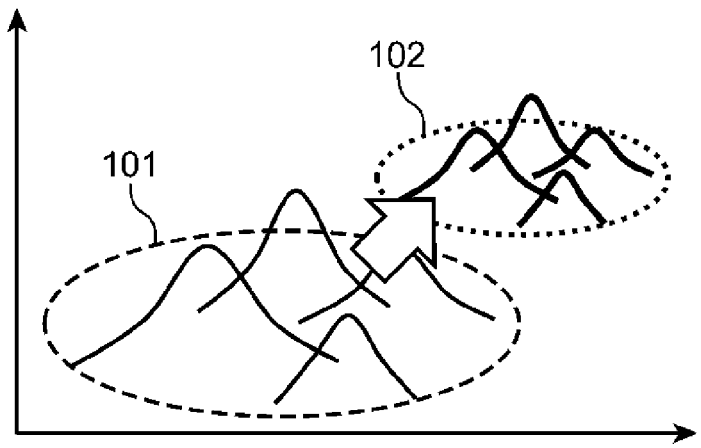
FIG. 4 is a diagram for explaining a second example of generation of a personal model on the basis of a UBM generated from voices of a plurality of unspecified speakers as acquired in noiseless ideal environments and voices of a speaker to be identified as acquired in noisy environments.
Figure 5:
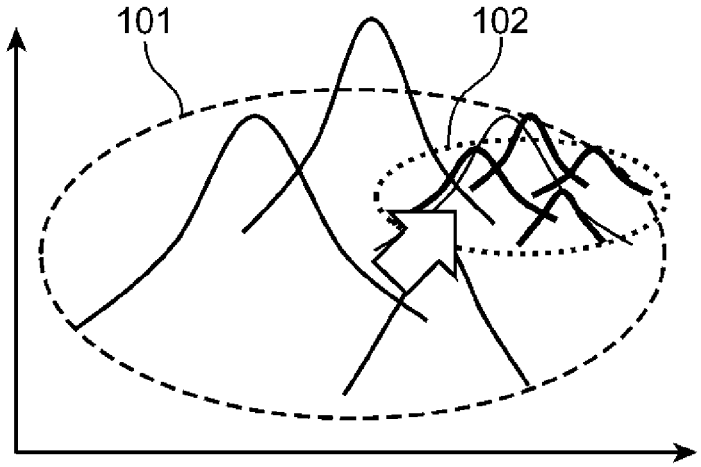
FIG. 5 is a diagram for explaining a third example of generation of a personal model on the basis of a UBM generated from voices of a plurality of unspecified speakers as acquired in noisy environments and voices of a speaker to be identified as acquired in noisy environments.

FIG. 3 is a diagram for explaining the first example of generation of a personal model on the basis of a UBM generated from voices of a plurality of unspecified speakers as acquired in noiseless ideal environments and voices of a speaker to be identified as acquired in noiseless ideal environments. FIG. 4 is a diagram for explaining the second example of generation of a personal model on the basis of a UBM generated from voices of a plurality of unspecified speakers as acquired in noiseless ideal environments and voices of a speaker to be identified as acquired in noisy environments. FIG. 5 is a diagram for explaining the third example of generation of a personal model on the basis of a UBM generated from voices of a plurality of unspecified speakers as acquired in noisy environments and voices of a speaker to be identified as acquired in noisy environments.

It should be noted that a personal model in Embodiment 1 is for example a GMM (mixture Gaussian distribution).

In the first example shown in FIG. 3, a GMM 102 of the speaker to be identified is included in a UBM 101. This shows that an accurate personal model of the speaker to be identified can be generated from the UBM 101.

Further, in the second example shown in FIG. 4, a GMM 102 of the speaker to be identified is not included in a UBM 101. This shows that an accurate personal model of the speaker to be identified cannot be generated from the UBM 101.

Furthermore, in the third example shown in FIG. 5, a GMM 102 of the speaker to be identified is included in a UBM 101. This shows that an accurate personal model of the speaker to be identified can be generated from the UBM 101.

All these show that in a case where a personal model is generated on the basis of a UBM generated from voices of a plurality of unspecified speakers as acquired in noiseless ideal environments and voices of a speaker to be identified as acquired in noisy environments, there is a risk of being unable to generate an accurate personal model, and that in a case where a personal model is generated on the basis of a UBM generated from voices of a plurality of unspecified speakers as acquired in noisy environments and voices of a speaker to be identified as acquired in noisy environments, an accurate personal model can be generated and a higher identification rate can be achieved.

It should be noted that in a case where a personal model is generated on the basis of a UBM generated from voices of a plurality of unspecified speakers as acquired in noisy environments and voices of a speaker to be identified as acquired in noiseless ideal environments, a GMM 102 of the speaker to be identified is included in a UBM 101 and this makes it possible to generate an accurate personal model from the UBM 101.

The following describes a simulation experiment in which speakers were identified through the use of a noise-containing UBM and a noise-free UBM.

In the simulation experiment, twenty speakers (ten males and ten females) are identified in noise environments. In the simulation experiment, a UBM generation process was performed to generate a first UBM (noise-containing UBM) from voices of a plurality of unspecified speakers onto which noise had been superimposed and generate a second UBM (noise-free UBM) from voices of a plurality of unspecified speakers onto which no noise had been superimposed. Then, a learning process was performed to generate a first personal model from the first UBM and learning voice data and generate a second personal model from the second UBM and the learning voice data. Further, a speaker identification process was performed to generate a third personal model from the first UBM and identification voice data and generate a fourth personal model from the second UBM and the identification voice data. Furthermore, a comparison between the third personal model and the first personal model and a comparison between the fourth personal model and the second personal model were made to calculate an identification rate achieved through the use of the first UBM and an identification rate achieved through the use of the second UBM.

FIG. 6 is a table showing the types of environment in which noise was acquired for use in the simulation experiment and the types of noise acquired.

As shown in FIG. 6, noise was acquired in five types of environment, namely an in-car environment, an outdoor environment, a semi-outdoor environment, an indoor environment, and a during-the-performance environment, and these five types of environment show different trends in frequency characteristics. The types of noise contained in the UBM are the in-car noise of an automobile with a displacement of 1000 cc, noise on the road, noise inside a station, noise in a first factory, and the sound of a piano. Further, the types of noise contained in the learning voice data that is used in the learning process and the identification voice data that is used in the speaker identification process are the in-car noise of an automobile with a displacement of 2000 cc, noise in a crowd, noise on the platform, noise in a second factory that is different from the first factory, and the sound of a flute.

Thus, in the simulation experiment, the noise contained in the UBM and the noise contained in the learning voice data and the identification voice data originate from different sound sources.

Figure 8:
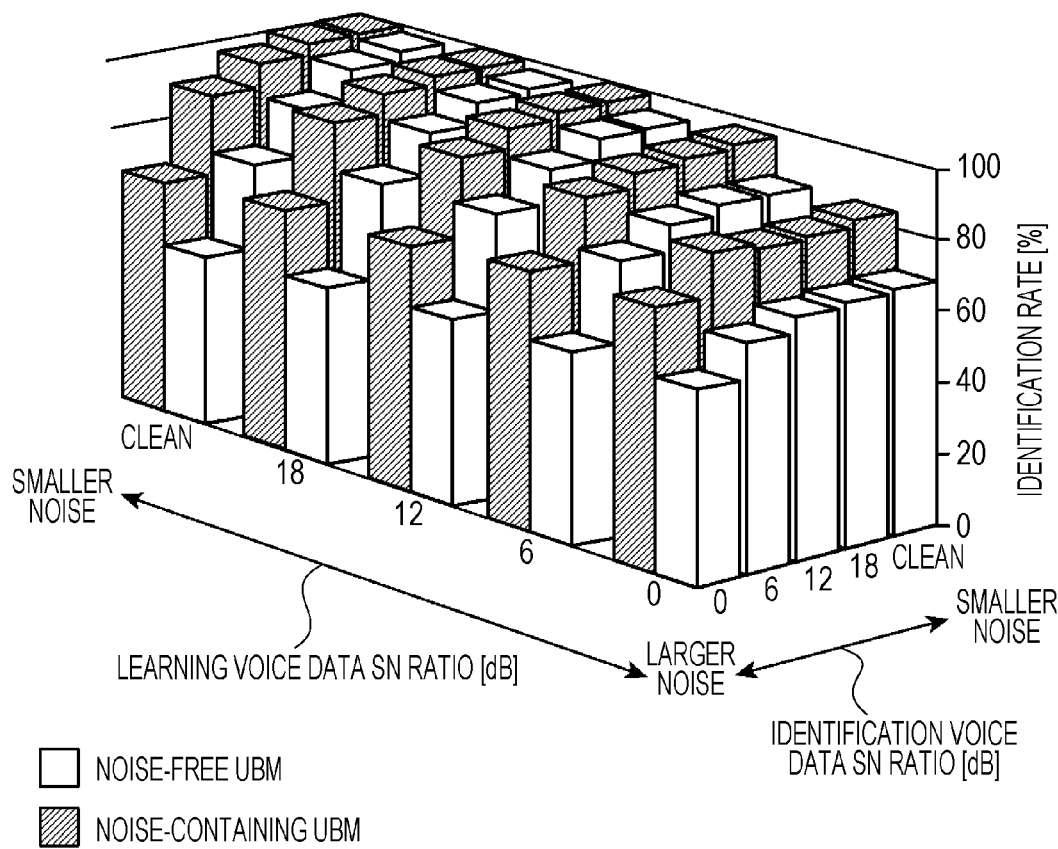
FIG. 8 is a diagram showing a graph form of the table shown in FIG. 7.

FIG. 7 is a table showing, in the simulation experiment, identification rates respectively corresponding to the SN ratios of the learning voice data and the SN ratios of the identification voice data in the case of use of the noise-containing UBM and identification rates respectively corresponding to the SN ratios of the learning voice data and the SN ratios of the identification voice data in the case of use of the noise-free UBM. FIG. 8 is a diagram showing a graph form of the table shown in FIG. 7. In FIG. 8, the vertical axis represents the identification rate (%), the horizontal axis represents the learning voice data SN ratio (dB), and the depth axis represents the identification voice data SN ratio (dB). Further, the SN ratio indicates a sound pressure difference between voice and noise.

In the simulation experiment, the plurality of noises shown in FIG. 6 were averaged, and the averaged noise is mixed into the learning voice data and the identification voice data at predetermined SN ratios. The SN ratios of the learning voice data and the SN ratios of the identification voice data varied from 0 dB, 6 dB, 12 dB, and 18 dB to noise-free values (CLEAN).

In the learning process, the first personal model was generated from the noise-containing first UBM and the learning voice data, and the second personal model was generated from the noise-free second UBM and the learning voice data. Further, in the speaker identification process, the third personal model was generated from the noise-containing first UBM and the identification voice data, and the fourth personal model was generated from the noise-free second UBM and the identification voice data. Furthermore, a comparison between the third personal model and the first personal model and a comparison between the fourth personal model and the second personal model were made to calculate identification rates achieved through the use of the noise-containing first UBM and identification rates achieved through the use of the noise-free second UBM.

As shown in FIGS. 7 and 8, the results of the simulation experiment show that, at all SN ratios, the identification rates achieved through the use of the noise-containing first UBM are higher than the identification rates achieved through the use of the noise-free second UBM. In particular, in a case where the SN ratios of the learning voice data and the SN ratios of the identification voice data are 6 dB or higher and the speakers were identified through the use of the noise-containing first UBM, the identification rates are 90% or higher. This confirms that incorporating noise into a UBM in advance brings about improvement in robustness with respect to the noise.

Figure 9:
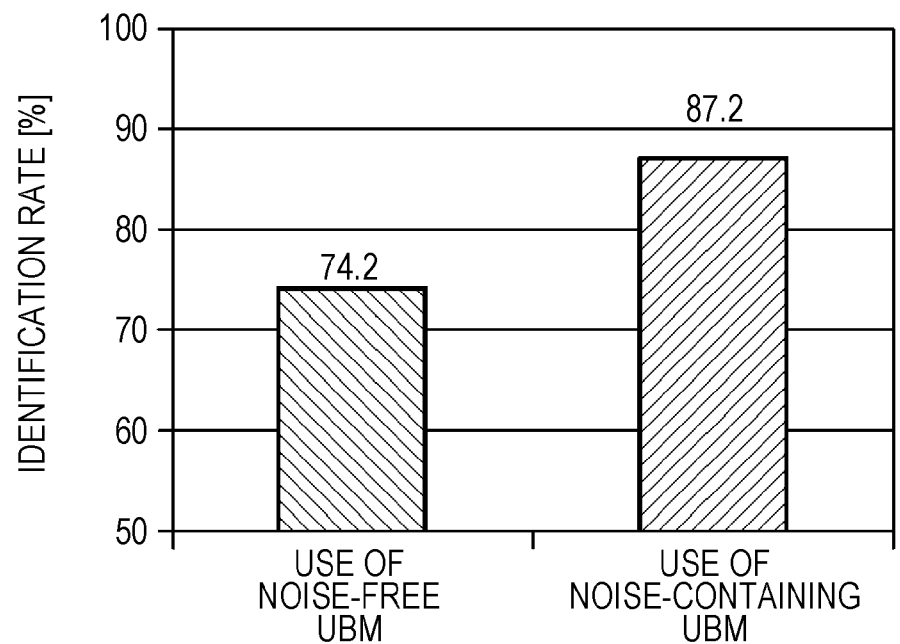
FIG. 9 is a graph showing, in the simulation experiment, the average of the identification rates in the case of learning and speaker identification through the use of the noise-containing UBM and the average of the identification rates in the case of learning and speaker identification through the use of the noise-free UBM.

FIG. 9 is a graph showing, in the simulation experiment, the average of the identification rates in the case of learning and speaker identification through the use of the noise-containing UBM and the average of the identification rates in the case of learning and speaker identification through the use of the noise-free UBM.

As shown in FIG. 9, the average of the identification rates in the case of learning and speaker identification through the use of the noise-containing UBM is 87.2%, and the average of the identification rates in the case of learning and speaker identification through the use of the noise-free UBM is 74.2%. This also shows that, in the case of learning and speaker identification through the use of the noise-containing UBM, the accuracy of speaker identification can be more improved than in the case of learning and speaker identification through the use of the noise-free UBM.

Embodiment 2

Figure 10:
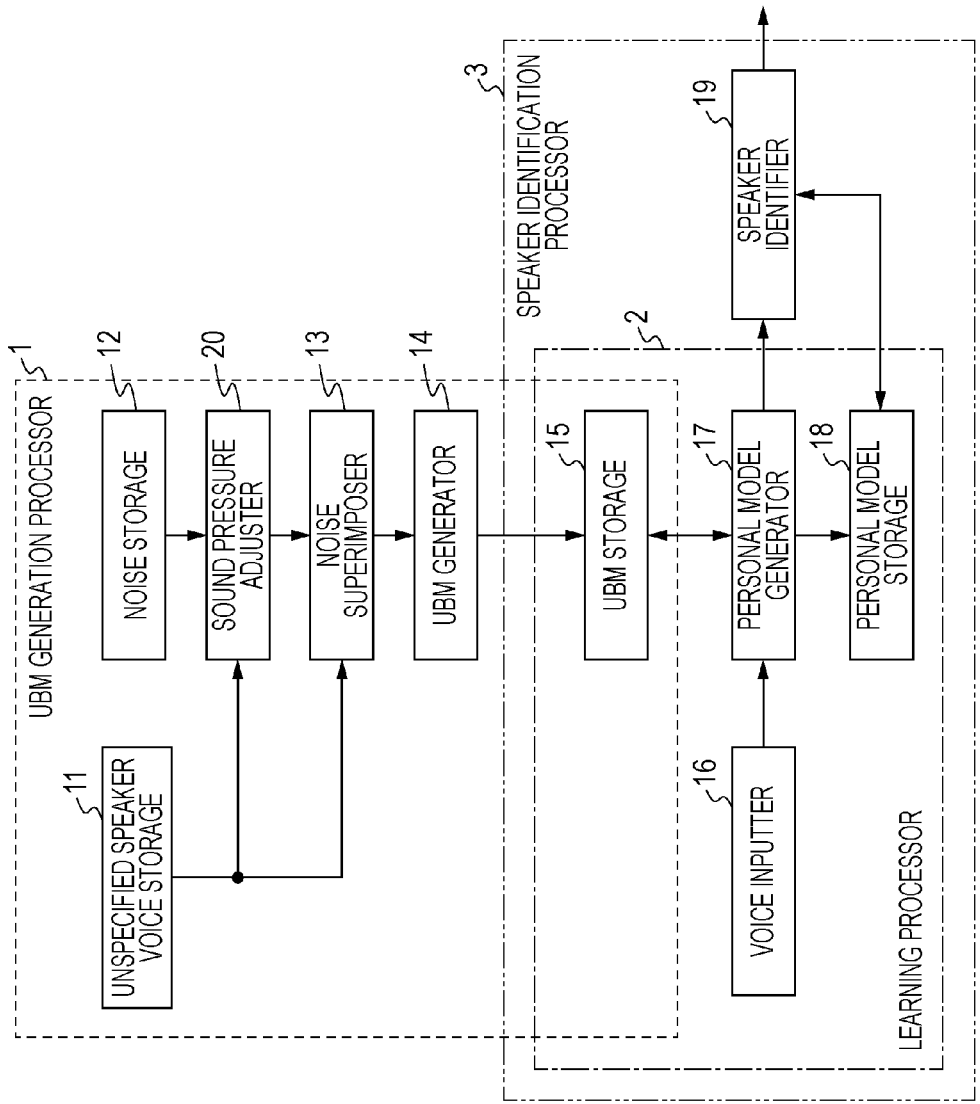
FIG. 10 is a diagram showing a configuration of a speaker identification apparatus according to Embodiment 2.

FIG. 10 is a diagram showing a configuration of a speaker identification apparatus according to Embodiment 2. The speaker identification apparatus is built, for example, in a television, a smartphone, a car navigation system, or the like.

As shown in FIG. 10, the speaker identification apparatus includes an unspecified speaker voice storage 11, a noise storage 12, a noise superimposer 13, a UBM generator 14, a UBM storage 15, a voice inputter 16, a personal model generator 17, a personal model storage 18, a speaker identifier 19, and a sound pressure adjuster 20.

Further, a UBM generation processor 1 is constituted by the unspecified speaker voice storage 11, the noise storage 12, the noise superimposer 13, the UBM generator 14, the UBM storage 15, and the sound pressure adjuster 20. A learning processor 2 is constituted by the UBM storage 15, the voice inputter 16, the personal model generator 17, and the personal model storage 18. A speaker identification processor 3 is constituted by the UBM storage 15, the voice inputter 16, the personal model generator 17, the personal model storage 18, and the speaker identifier 19.

It should be noted that those components of Embodiment 2 which are the same as those of Embodiment 1 are given the same reference numerals and, as such, are not described below.

The sound pressure adjuster 20 adjusts the sound pressure of the noise on the basis of the sound pressures of the voices of the plurality of unspecified speakers. For example, the sound pressure adjuster 20 adjusts the sound pressure of the noise so that the sound pressure difference between the average sound pressure of the voices of the plurality of unspecified speakers and the sound pressure of the noise takes on a predetermined value. The noise superimposer 13 superimposes, onto the voices of the plurality of unspecified speakers, the noise whose sound pressure has been adjusted.

It should be noted that the sound pressure adjuster 20 may alternatively adjust the sound pressure of the noise so that the sound pressure difference between the sound pressure of each of the voices of the plurality of unspecified speakers and the sound pressure of the noise takes on the predetermined value.

Figure 11:
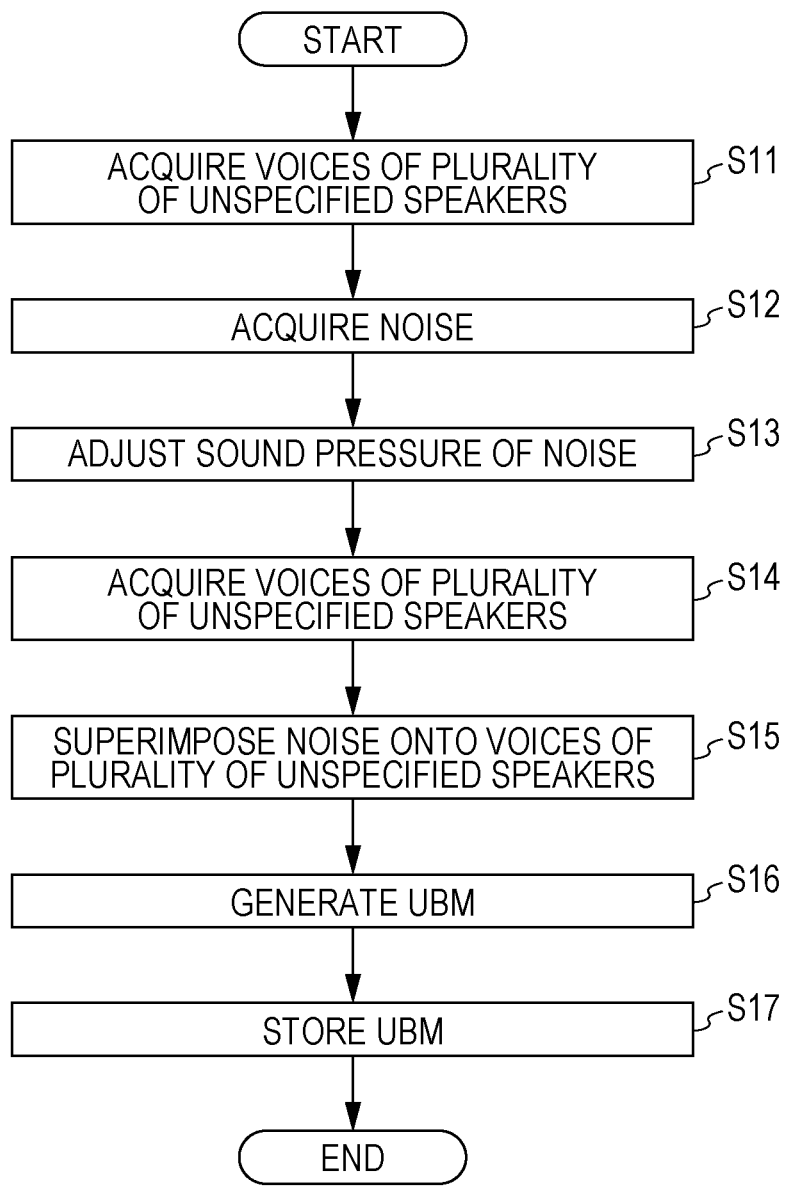
FIG. 11 is a flow chart for explaining the actions in a UBM generation process that is performed by the speaker identification apparatus according to Embodiment 2.

The following describes the actions in a UBM generation process (voice dictionary generation process) that is performed the speaker identification apparatus according to Embodiment 2. FIG. 11 is a flow chart for explaining the actions in the UBM generation process that is performed by the speaker identification apparatus according to Embodiment 2.

First, in step S11, the sound pressure adjuster 20 acquires voices of a plurality of unspecified speakers from the unspecified speaker voice storage 11.

Next, in step S12, the sound pressure adjuster 20 acquires noise from the noise storage 12.

Next, in step S13, the sound pressure adjuster 20 adjusts the sound pressure of the noise on the basis of the sound pressures of the voices of the plurality of unspecified speakers. As mentioned above, the sound pressure adjuster 20 adjusts the sound pressure of the noise so that the sound pressure difference between the average sound pressure of the voices of the plurality of unspecified speakers and the sound pressure of the noise takes on a predetermined value. Note here that the predetermined value may be a sound pressure at which the identification rate is equal to or greater than a predetermined value, and is calculated by an experiment of speaker identification through the use of a plurality of UBMs created with varying sound differences between the voices of the unspecified speakers and the noise.

Next, in step S14, the noise superimposer 13 acquires the voices of the plurality of unspecified speakers from the unspecified speaker voice storage 11.

Next, in step S15, the noise superimposer 13 superimposes, onto each of the voices of the plurality of unspecified speakers, the noise whose sound pressure has been adjusted by the sound pressure adjuster 20.

It should be noted that the processes in steps S16 and S17 shown in FIG. 11 are the same as those in steps S4 and S5 shown in FIG. 2 and, as such, are not described below.

Thus, since the sound pressure of the noise that is superimposed onto the voices of the plurality of unspecified speakers is adjusted, the noise whose sound pressure is most suitable for generating the UBM can be superimposed. This makes it possible to improve the accuracy of speaker identification.

The following describes the actions in a UBM generation process (voice dictionary generation process) that is performed by a speaker identification apparatus according to a modification of Embodiment 2. In Embodiment 2 described above, the sound pressure adjuster 20 adjusts the sound pressure of the noise so that the sound pressure difference between the average sound pressure of the voices of the plurality of unspecified speakers and the sound pressure of the noise takes on a predetermined value. On the other hand, in the modification of Embodiment 2, the sound pressure adjuster 20 may make the predetermined value larger in the case of a failure to identify the speaker to be identified.

In this case, the voice inputter 16 acquires voices of the speaker to be identified in the process of learning a personal model (personal voice dictionary). The personal model generator 17 generates a personal model (personal voice dictionary) through the use of the voices thus acquired of the speaker to be identified and a UBM (unspecified speaker voice dictionary) generated. The voice inputter 16 acquires voices of the speaker to be identified in the process of identifying the speaker to be identified. The speaker identifier 19 identifies the speaker to be identified through the use of the personal model (personal voice dictionary) thus generated and the voices thus acquired of the speaker to be identified. The sound pressure adjuster 20 makes the predetermined value larger in the case of a failure to identify the speaker to be identified.

Figure 12:
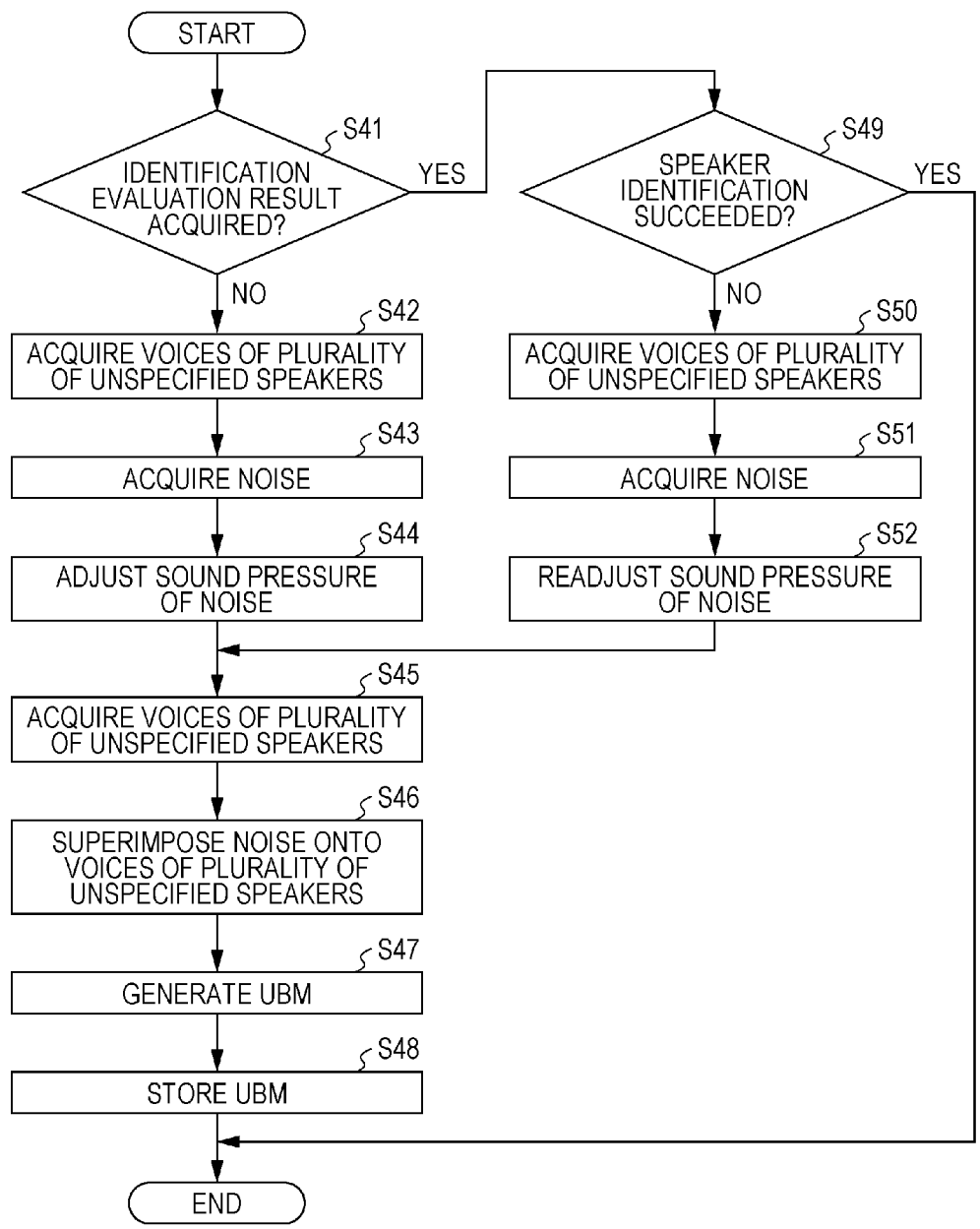
FIG. 12 is a flow chart for explaining the actions in a UBM generation process that is performed by a speaker identification apparatus according to a modification of Embodiment 2.

FIG. 12 is a flow chart for explaining the actions in the UBM generation process that is performed by the speaker identification apparatus according to a modification of Embodiment 2.

First, in step S41, the sound pressure adjuster 20 determines whether it has acquired an identification evaluation result indicating whether the speaker identification has succeeded. Note here that the speaker identification apparatus may include an evaluation result inputter that accepts, from the speaker, an input of an identification evaluation result indicating whether the speaker identification has succeeded. That is, in response to an identification result from the speaker identifier 19, the evaluation result inputter accepts, from the speaker, an input of an identification evaluation result indicating whether the speaker identification has succeeded. The evaluation result inputter outputs the identification evaluation result to the sound pressure adjuster 20.

In a case where the sound pressure adjuster 20 determines in step S41 that it has not acquired an identification evaluation result (NO in step S41), the process proceeds to step S42. It should be noted that the processes in steps S42 to S48 shown in FIG. 12 are the same as those in steps S11 to S17 shown in FIG. 11 and, as such, are not described below.

On the other hand, in a case where the sound pressure adjuster 20 determines that it has acquired an identification evaluation result (YES in step S41), the sound pressure adjuster 20 proceeds to step S49, in which the sound pressure adjuster 20 determines, from the identification evaluation result, whether the speaker identification has succeeded. In a case where the sound pressure adjuster 20 determines in step S49 that the speaker identification has succeeded (YES in step S49), the UBM generation process ends.

On the other hand, in a case where the sound pressure adjuster 20 determines that the speaker identification has failed (NO in step S49), the sound pressure adjuster 20 proceeds to step S50, in which the sound pressure adjuster 20 acquires the voices of the plurality of unspecified speakers from the unspecified speaker voice storage 11.

Next, in step S51, the sound pressure adjuster 20 acquires the noise from the noise storage 12.

Next, in step S52, the sound pressure adjuster 20 readjusts the sound pressure of the noise on the basis of the sound pressures of the voices of the plurality of unspecified speakers. In a case where the sound pressure adjuster 20 determines that the speaker identification has failed, the sound pressure adjuster 20 makes the predetermined value larger and readjusts the sound pressure of the noise so that the sound pressure difference between the average sound pressure of the voices of the plurality of unspecified speakers and the sound pressure of the noise takes on the predetermined value thus changed. For example, in a case where the sound pressure adjuster 20 determines that the speaker identification has failed, the sound pressure adjuster 20 may make the predetermined value larger than the current sound pressure difference. That is, in a case where the current sound pressure difference is 6 dB and the sound pressure adjuster 20 determines that the speaker identification has failed, the sound pressure adjuster 20 may adjust the sound pressure of the noise so that the sound pressure difference between the average sound pressure of the voices of the plurality of unspecified speakers and the sound pressure of the noise takes on 12 dB, which is larger than the current sound pressure difference.

Thus, since, in the case of a failure in identification of a speaker to be identified, the predetermined value is made larger and the sound pressure of the noise that is superimposed onto the voices of the plurality of unspecified speakers is adjusted, the noise whose sound pressure is most suitable for generating the UBM can be superimposed. This makes it possible to further improve the accuracy of speaker identification.

Embodiment 3

Figure 13:
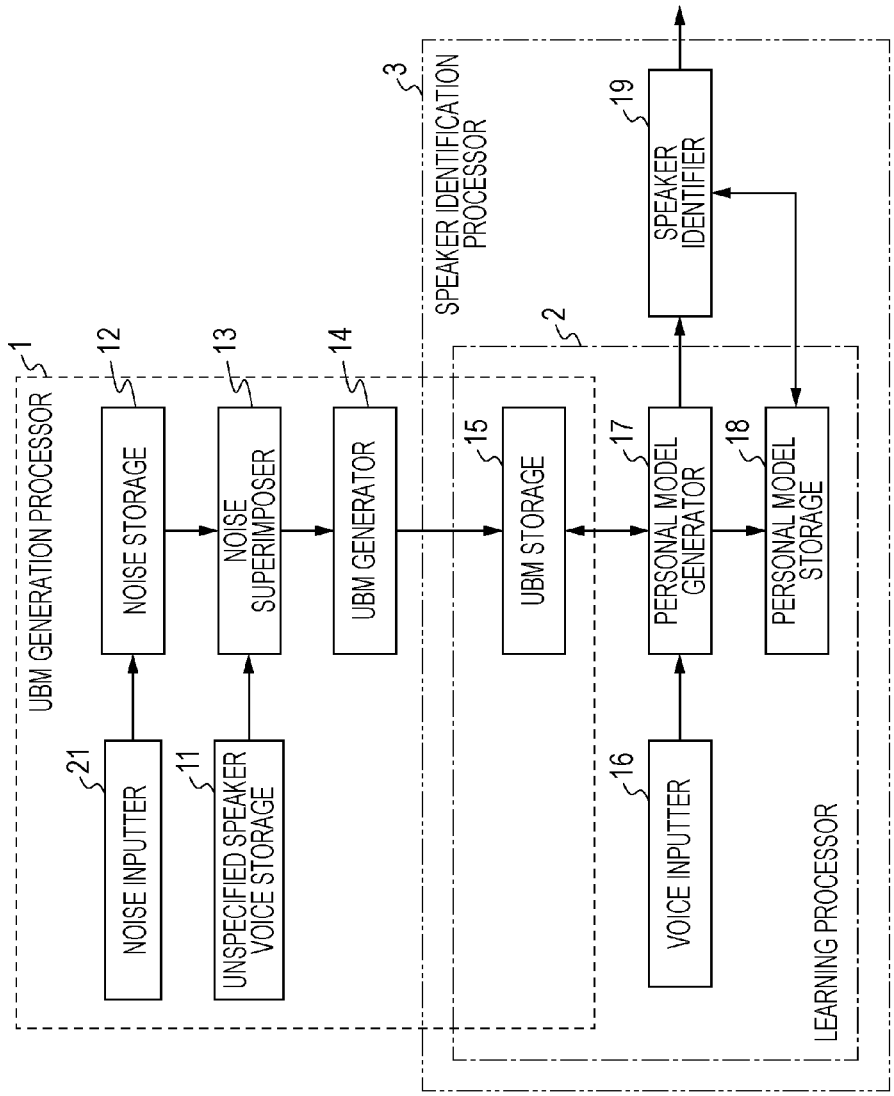
FIG. 13 is a diagram showing a configuration of a speaker identification apparatus according to Embodiment 3.

FIG. 13 is a diagram showing a configuration of a speaker identification apparatus according to Embodiment 3. The speaker identification apparatus is built, for example, in a television, a smartphone, a car navigation system, or the like.

As shown in FIG. 13, the speaker identification apparatus includes an unspecified speaker voice storage 11, a noise storage 12, a noise superimposer 13, a UBM generator 14, a UBM storage 15, a voice inputter 16, a personal model generator 17, a personal model storage 18, a speaker identifier 19, and a noise inputter 21.

Further, a UBM generation processor 1 is constituted by the unspecified speaker voice storage 11, the noise storage 12, the noise superimposer 13, the UBM generator 14, the UBM storage 15, and the noise inputter 21. A learning processor 2 is constituted by the UBM storage 15, the voice inputter 16, the personal model generator 17, and the personal model storage 18. A speaker identification processor 3 is constituted by the UBM storage 15, the voice inputter 16, the personal model generator 17, the personal model storage 18, and the speaker identifier 19.

It should be noted that those components of Embodiment 3 which are the same as those of Embodiment 1 are given the same reference numerals and, as such, are not described below.

The noise inputter 21 is constituted, for example, by a microphone, and in the UBM generation process, the noise inputter 21 collects the noise of an environment surrounding a place where speaker identification takes place, converts the noise thus collected into voice signals, and stores them in the noise storage 12. It should be noted that in a case where the speaker identification apparatus is disposed in the place where speaker identification takes place, the noise inputter 21 collects the noise of the area around the speaker identification apparatus.

It should be noted that although, in Embodiment 3, the speaker identification apparatus includes the voice inputter 16 and the noise inputter 21, the present disclosure is not particularly limited to this and the speaker identification apparatus may include only the voice inputter 16. In this case, the voice inputter 16 collects voices of the speaker to be identified and the noise of the surrounding environment.

Figure 14:
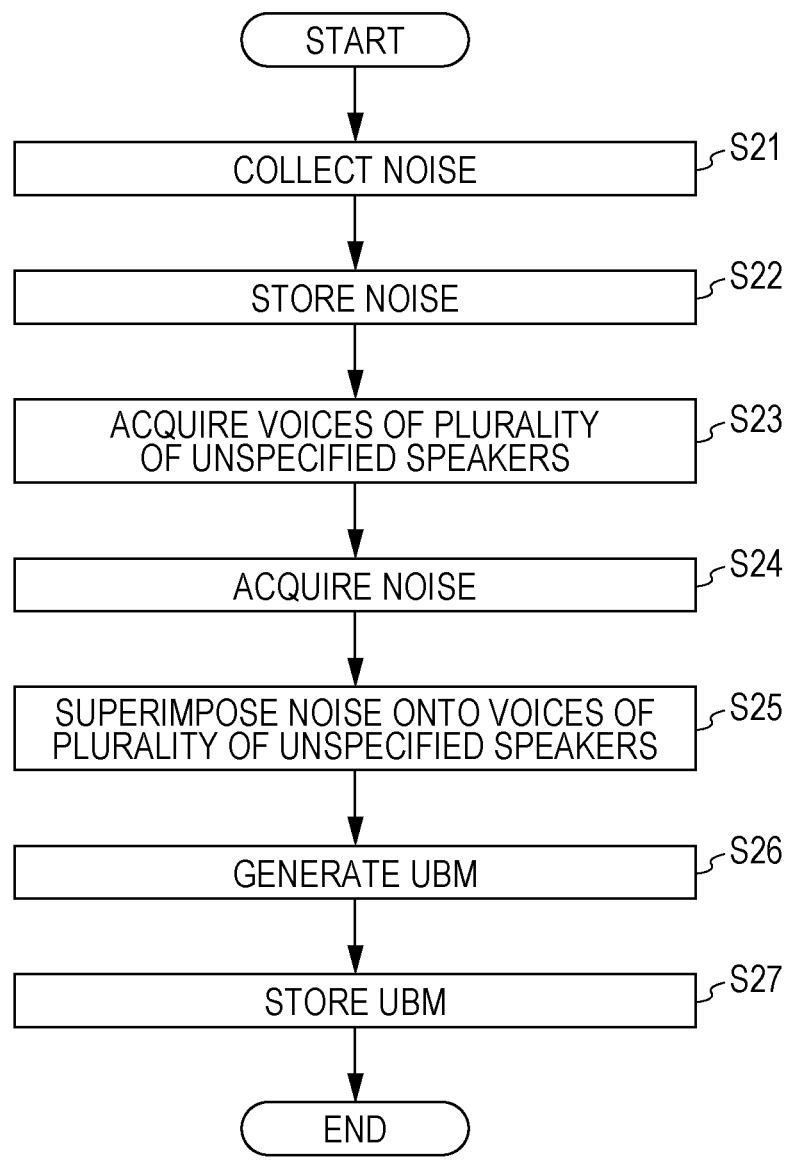
FIG. 14 is a flow chart for explaining the actions in a UBM generation process that is performed by the speaker identification apparatus according to Embodiment 3.

The following describes the actions in a UBM generation process (voice dictionary generation process) that is performed by the speaker identification apparatus according to Embodiment 3. FIG. 14 is a flow chart for explaining the actions in the UBM generation process that is performed by the speaker identification apparatus according to Embodiment 3.

First, in step S21, the noise inputter 21 collects the noise of an environment surrounding a place where speaker identification takes place.

Next, in step S22, the noise inputter 21 stores the noise thus collected in the noise storage 12.

It should be noted that the processes in steps S23 to S27 shown in FIG. 14 are the same as those in steps S1 to S5 shown in FIG. 2 and, as such, are not described below.

Since the noise of the environment surrounding the place where the speaker to be identified is identified is collected and the noise thus collected is stored in the noise storage 12, the noise of the environment surrounding the place where the speaker to be identified is actually identified can be superimposed onto the voices of the plurality of unspecified speakers. This makes it possible to further improve the accuracy of speaker identification.

Embodiment 4

Figure 15:
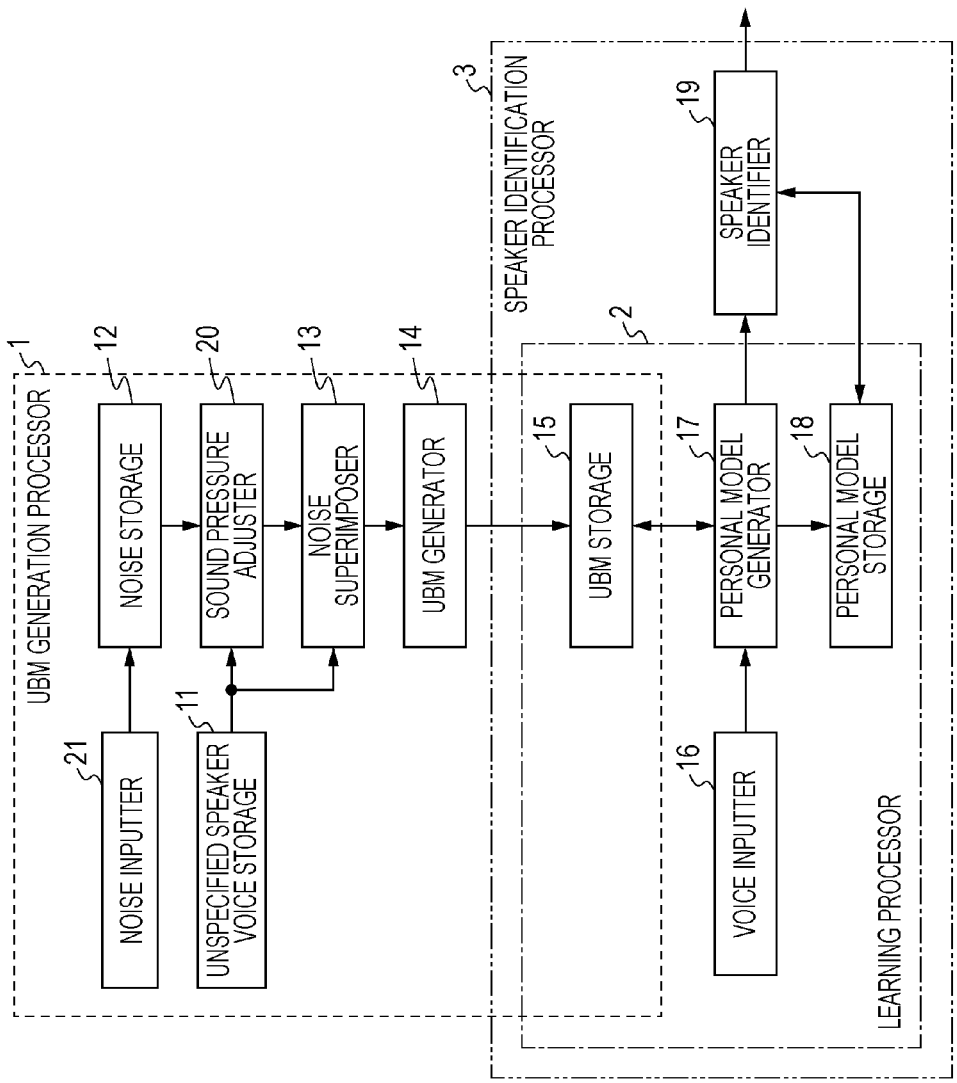
FIG. 15 is a diagram showing a configuration of a speaker identification apparatus according to Embodiment 4.

FIG. 15 is a diagram showing a configuration of a speaker identification apparatus according to Embodiment 4. The speaker identification apparatus is built, for example, in a television, a smartphone, a car navigation system, or the like.

As shown in FIG. 15, the speaker identification apparatus includes an unspecified speaker voice storage 11, a noise storage 12, a noise superimposer 13, a UBM generator 14, a UBM storage 15, a voice inputter 16, a personal model generator 17, a personal model storage 18, a speaker identifier 19, a sound pressure adjuster 20, and a noise inputter 21.

Further, a UBM generation processor 1 is constituted by the unspecified speaker voice storage 11, the noise storage 12, the noise superimposer 13, the UBM generator 14, the UBM storage 15, the sound pressure adjuster 20, and the noise inputter 21. A learning processor 2 is constituted by the UBM storage 15, the voice inputter 16, the personal model generator 17, and the personal model storage 18. A speaker identification processor 3 is constituted by the UBM storage 15, the voice inputter 16, the personal model generator 17, the personal model storage 18, and the speaker identifier 19.

It should be noted that those components of Embodiment 4 which are the same as those of Embodiments 1 to 3 are given the same reference numerals and, as such, are not described below.

The noise inputter 21 is constituted, for example, by a microphone, and in the UBM generation process, the noise inputter 21 collects the noise of an environment surrounding a place where speaker identification takes place, converts the noise thus collected into voice signals, and stores them in the noise storage 12. It should be noted that in a case where the speaker identification apparatus is disposed in the place where speaker identification takes place, the noise inputter 21 collects the noise of the area around the speaker identification apparatus.

The sound pressure adjuster 20 adjusts the sound pressure of the noise on the basis of the sound pressures of the voices of the plurality of unspecified speakers. For example, the sound pressure adjuster 20 adjusts the sound pressure of the noise so that the sound pressure difference between the average sound pressure of the voices of the plurality of unspecified speakers and the sound pressure of the noise takes on a predetermined value.

The noise superimposer 13 superimposes, onto the voices of the plurality of unspecified speakers, the noise whose sound pressure has been adjusted.

It should be noted that although, in Embodiment 4, the speaker identification apparatus includes the voice inputter 16 and the noise inputter 21, the present disclosure is not particularly limited to this and the speaker identification apparatus may include only the voice inputter 16. In this case, the voice inputter 16 collects voices of the speaker to be identified and the noise of the surrounding environment.

Figure 16:
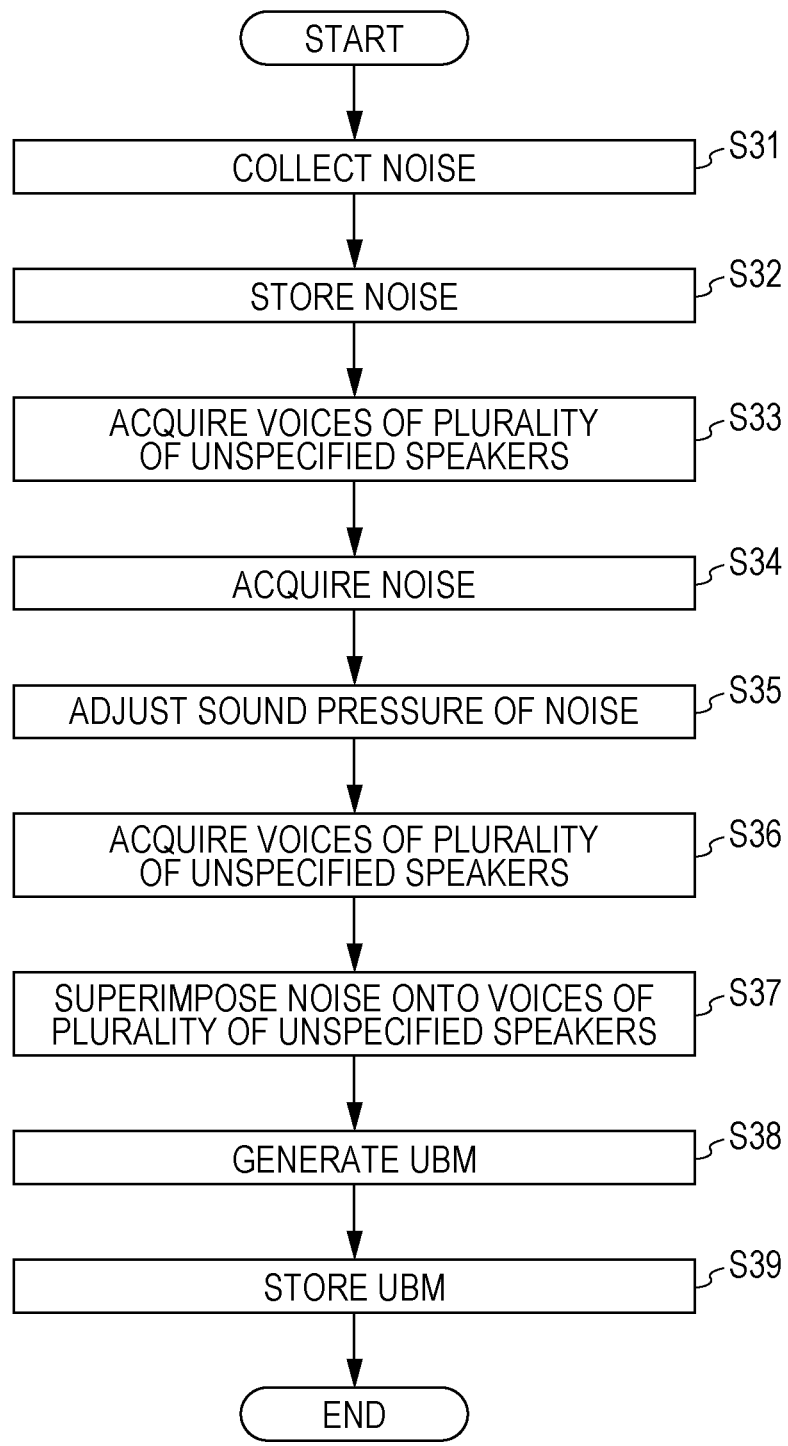
FIG. 16 is a flow chart for explaining the actions in a UBM generation process that is performed by the speaker identification apparatus according to Embodiment 4.

The following describes the actions in a UBM generation process (voice dictionary generation process) that is performed by the speaker identification apparatus according to Embodiment 4. FIG. 16 is a flow chart for explaining the actions in the UBM generation process that is performed by the speaker identification apparatus according to Embodiment 4.

First, in step S31, the noise inputter 21 collects the noise of an environment surrounding a place where speaker identification takes place.

Next, in step S32, the noise inputter 21 stores the noise thus collected in the noise storage 12.

Next, in step S33, the sound pressure adjuster 20 acquires voices of a plurality of unspecified speakers from the unspecified speaker voice storage 11.

Next, in step S34, the sound pressure adjuster 20 acquires the noise from the noise storage 12.

Next, in step S35, the sound pressure adjuster 20 sound pressure of the noise on the basis of the sound pressure of the voices of the plurality of unspecified speakers. As mentioned above, the sound pressure adjuster 20 adjusts the sound pressure of the noise so that the sound pressure difference between the average sound pressure of the voices of the plurality of unspecified speakers and the sound pressure of the noise takes on a predetermined value. Note here that the predetermined value may be a sound pressure at which the identification rate is equal to or greater than a predetermined value, and is calculated by an experiment of speaker identification through the use of a plurality of UBMs created with varying sound differences between the voices of the unspecified speakers and the noise.

Next, in step S36, the noise superimposer 13 acquires the voices of the plurality of unspecified speakers from the unspecified speaker voice storage 11.

Next, in step S37, the noise superimposer 13 superimposes, onto each of the voices of the plurality of unspecified speakers, the noise whose sound pressure has been adjusted by the sound pressure adjuster 20.

It should be noted that the processes in steps S38 and S39 shown in FIG. 16 are the same as those in steps S4 and S5 shown in FIG. 2 and, as such, are not described below.

Since the noise of the environment surrounding the place where the speaker to be identified is identified is collected and the sound pressure of the noise thus collected is adjusted, the noise of the environment surrounding the place where the speaker to be identified is actually identified can be superimposed onto the voices of the plurality of unspecified speakers. This makes it possible to further improve the accuracy of speaker identification.

It should be noted that although the speaker identification apparatuses according to Embodiments 1 to 4 of the present disclosure identify speakers by the speaker identification method called "i-vector", the present disclosure is not particularly limited to this and speakers may be identified by another speaker identification method such as GMM-UBM or a neural network.

A voice dictionary generation method, a voice dictionary generation apparatus, and a non-transitory computer-readable recording medium storing a voice dictionary generation program according to the present disclosure make it possible to improve the accuracy of speaker identification and are useful in a method for, an apparatus for, and a non-transitory computer-readable recording medium storing a program for generating an unspecified speaker voice dictionary that is used for generating a personal voice dictionary for identifying a speaker to be identified.

What is claimed is:

1. A method comprising:
   acquiring, via a processor, voices of a plurality of unspecified speakers;
   acquiring, via the processor, noise in a predetermined place;
   adjusting, via the processor, a sound pressure of the noise based on sound pressures of the voices of the plurality of unspecified speakers;
   superimposing, via the processor, the noise whose sound pressure has been adjusted onto the voices of the plurality of unspecified speakers; and
   generating, via the processor, an unspecified speaker voice dictionary from features of the voices of the plurality of unspecified speakers onto which the noise has been superimposed,
   wherein the unspecified speaker voice dictionary is used in generating a personal voice dictionary for identifying a target speaker.

2. The method according to claim 1, further comprising adjusting, via the processor, the sound pressure of the noise so that a sound pressure difference between (i) an average sound pressure of the voices of the plurality of unspecified speakers and (ii) the sound pressure of the noise takes is a predetermined value.

3. The method according to claim 2, further comprising:
   acquiring, via the processor, a first voice of the target speaker in a process of learning the personal voice dictionary;
   generating, via the processor, the personal voice dictionary using the acquired voice of the target speaker and the generated unspecified speaker voice dictionary;
   acquiring, via the processor, a second voice of the target speaker in a process of identifying the target speaker;
   identifying, via the processor, the target speaker using the generated personal voice dictionary and the acquired second voice of the target speaker; and
   changing, via the processor, the predetermined value to be larger when the identifying the target speaker fails.

4. The method according to claim 1, further comprising:
   acquiring, via the processor, the voices of the plurality of unspecified speakers from a first memory storing the voices of the plurality of unspecified speakers in advance; and
   acquiring, via the processor, the noise from a second memory storing the noise in advance.

5. The method according to claim 4, further comprising:
   collecting, via the processor, noise of an environment surrounding a place where the target speaker is identified; and
   storing the collected noise in the second memory.

6. The method according to claim 1, further comprising:
   acquiring, via the processor, a plurality of noises having different frequency characteristics; and
   superimposing, via the processor, the plurality of noises onto the voices of the plurality of unspecified speakers.

7. An apparatus comprising:
   a processor; and
   a memory storing therein a computer program, which when executed by the processor, causes the processor to perform operations including:
   acquiring voices of a plurality of unspecified speakers;
   acquiring noise in a predetermined place;
   adjusting a sound pressure of the noise based on sound pressures of the voices of the plurality of unspecified speakers;
   superimposing the noise whose sound pressure has been adjusted onto the voices of the plurality of unspecified speakers; and
   generating an unspecified speaker voice dictionary from features of the voices of the plurality of unspecified speakers onto which the noise has been superimposed,
   wherein the unspecified speaker voice dictionary is used in generating personal voice dictionary for identifying a target speaker.

8. A non-transitory recording medium storing thereon a computer program, which when executed by a processor, causes the processor to perform operations comprising:
   acquiring voices of a plurality of unspecified speakers;
   acquiring noise in a predetermined place;
   adjusting a sound pressure of the noise based on sound pressures of the voices of the plurality of unspecified speakers;
   superimposing the noise whose sound pressure has been adjusted onto the voices of the plurality of unspecified speakers; and
   generating an unspecified speaker voice dictionary from features of the voices of the plurality of unspecified speakers onto which the noise has been superimposed, wherein the unspecified speaker voice dictionary is used in generating personal voice dictionary for identifying a target speaker.

* * * * *